(12) United States Patent
Dorsey et al.

(10) Patent No.: US 7,836,257 B2
(45) Date of Patent: Nov. 16, 2010

(54) SYSTEM AND METHOD FOR CACHE LINE REPLACEMENT SELECTION IN A MULTIPROCESSOR ENVIRONMENT

(75) Inventors: Robert John Dorsey, Durham, NC (US); Jason Alan Cox, Raleigh, NC (US); Hien Minh Le, Cedar Park, TX (US); Richard Nicholas, Round Rock, TX (US); Eric Francis Robinson, Raleigh, NC (US); Thuong Quang Truong, Austin, TX (US)

(73) Assignee: International Business Machines Corpation, Armonk, NY (US)

( * ) Notice: Subject to any disclaimer, the term of this patent is extended or adjusted under 35 U.S.C. 154(b) by 509 days.

(21) Appl. No.: 11/959,804

(22) Filed: Dec. 19, 2007

(65) Prior Publication Data

US 2009/0164736 A1    Jun. 25, 2009

(51) Int. Cl.
*G06F 12/00* (2006.01)

(52) U.S. Cl. .............. 711/133; 711/118; 711/119; 711/124; 711/134; 711/136; 711/141; 711/159; 711/160

(58) Field of Classification Search .............. 711/118, 711/119, 124, 133–134, 136, 141, 159–160
See application file for complete search history.

(56) References Cited

U.S. PATENT DOCUMENTS

| | | | |
|---|---|---|---|
| 6,185,658 B1 * | 2/2001 | Arimilli et al. | ............. 711/133 |
| 6,247,098 B1 * | 6/2001 | Arimilli et al. | ............. 711/141 |
| 6,385,695 B1 | 5/2002 | Arimilli et al. | |
| 6,460,114 B1 | 10/2002 | Jeddeloh | |
| 6,970,976 B1 | 11/2005 | Arimilli et al. | |
| 7,076,609 B2 | 7/2006 | Garg et al. | |
| 7,277,992 B2 * | 10/2007 | Shannon et al. | ............. 711/141 |
| 2006/0123206 A1 | 6/2006 | Barrett et al. | |
| 2006/0179235 A1 | 8/2006 | Bell, Jr. et al. | |

(Continued)

OTHER PUBLICATIONS

Speight, Evan et al., Adaptive Mechanisms and Policies for Managing Cache Hierarchies in Chip Multiprocessors, International Conference on Computer Architecture; Proceedings of the 32nd Annual International Symposium on Computer Architecture, 2005, pp. 346-356.

(Continued)

*Primary Examiner*—Sanjiv Shah
*Assistant Examiner*—Arpan P. Savla
(74) *Attorney, Agent, or Firm*—Patrick E. Caldwell, Esq.; The Caldwell Firm, LLC

(57) ABSTRACT

A method for managing a cache operates in a data processing system with a system memory and a plurality of processing units (PUs). A first PU determines that one of a plurality of cache lines in a first cache of the first PU must be replaced with a first data block, and determines whether the first data block is a victim cache line from another one of the plurality of PUs. In the event the first data block is not a victim cache line from another one of the plurality of PUs, the first cache does not contain a cache line in coherency state invalid, and the first cache contains a cache line in coherency state moved, the first PU selects a cache line in coherency state moved, stores the first data block in the selected cache line and updates the coherency state of the first data block.

16 Claims, 6 Drawing Sheets

U.S. PATENT DOCUMENTS

2006/0179250 A1* 8/2006 Guthrie et al. ............. 711/143
2006/0184742 A1  8/2006 Clark et al.
2006/0184743 A1  8/2006 Guthrie et al.
2006/0230252 A1  10/2006 Dombrowski et al.
2006/0236037 A1  10/2006 Guthrie et al.

OTHER PUBLICATIONS

Zhang, Michael et al., Victim Replication: Maximizing Capacity while Hiding Wire Delay in Tiled Chip Multiprocessors, International Conference on Computer Architecture; Proceedings of the 32nd Annual International Symposium on Computer Architecture, 2005, pp. 336-345.

Memik, Gokhan et al., Reducing energy and delay using efficient victim caches, International Symposium on Low Power Electronics and Design; Proceedings of the 2003 international symposium on Low power electronics and design; Seoul, Korea; Session: Power efficient cache design, 2003, pp. 262-265.

Allu, Bramha et al., Exploiting the replication cache to improve performance for multiple-issue microprocessors, ACM SIGARCH Computer Architecture News archive; vol. 33, Issue 3 Special issue: MEDEA 2004 workshop; Column: Regular contributions, 2005, pp. 63-71.

Naz, Afrin et al., Making a case for split data caches for embedded applications, Memory Performance: Dealing With Applications, Systems And Architecture; Proceedings of the 2005 workshop on Memory performance: Dealing with Applications, systems and architecture; Saint Louis, Missouri; Special Issue: MEDEA'05, 2006, pp. 19-26.

Dybdahl, Haakon et al., An LRU-based replacement algorithm augmented with frequency of access in shared chip-multiprocessor caches, Memory Performance: Dealing With Applications, Systems And Architecture, Proceedings of the 2005 workshop on Memory performance: Dealing with Applications, 2006, pp. 45-52.

Temam, Oliver, Investigating optimal local memory performance, Architectural Support for Programming Languages and Operating Systems; Proceedings of the eighth international conference on Architectural support for programming languages and operating systems; San Jose, California, United States, 1998, pp. 218-227.

* cited by examiner

SYSTEM AND METHOD FOR CACHE LINE REPLACEMENT SELECTION IN A MULTIPROCESSOR ENVIRONMENT

TECHNICAL FIELD

The present invention relates generally to the field of computer networking and parallel processing and, more particularly, to a system and method for improved cache line replacement selection in a multiprocessor environment.

BACKGROUND OF THE INVENTION

Modern electronic devices often include multiple processors, each sometimes referred to as a processing unit (PU), that each include core logic (a "core"), a level one (L1) cache, and a level 2 (L2) cache. Typically, each core can access only its own dedicated L2 cache, and cannot normally access the L2 cache of a nearby PU.

One skilled in the art will understand that there are many scenarios in which a core does not use its dedicated L2 cache to the maximum extent possible. For example, this may occur when a core executes code that uses the L2 cache only slightly or code from locked cache ways, when a core is powered down or in sleep mode, or when a core has been disabled, as, for example, in response to a detected manufacturing defect. These examples are but a sample of the many common scenarios in which a core underutilizes its dedicated L2 cache.

In light of this underutilization, there have been several attempts to improve cache performance, including some systems wherein one or more PUs share certain levels of their caches with each other. Each of the current approaches suffers from one or more disadvantages. Generally, one set of solutions focuses on castout handling, wherein the PU selects a cache line to "cast out" of its cache, ordinarily in order to make room for an incoming cache block that will be stored in the cache location currently occupied by the cache line selected for castout.

For example, one simple solution is to evict or "cast out" all cache lines to memory. That is, the simplest solution is to write back castout cache lines to memory when they are cast out. The castout lines can subsequently be retrieved over a common coherent bus, to which all L2 caches (and their associated PUs) are attached. However, this approach suffers from the obvious drawback that casting out all lines all the way to memory is inefficient and hinders performance. Further, this method does not enable one core to share another core's cache when that cache is underutilized. Additionally, this approach does not allow a cache to be employed when its core is powered down in sleep mode or has been deactivated because of a core manufacturing defect.

Another conventional approach provides a dedicated victim cache for each L2 cache. In this approach, evicted lines are cast out to the victim cache, and the victim cache is typically configured to hold only cache lines evicted from the L2 cache on a cache miss. This approach, however, adds an extra cache and supporting hardware, which consumes a greater area and power than the L2 cache by itself. Additionally, typical victim caches ordinarily allot space for only one or two lines per congruence class, compared to the six to eight lines in a standard cache, which therefore provides only a limited solution.

In another approach, hereinafter referred to as the Former approach, the PUs couple to a common L3 cache, and the L3 cache preselects one of three neighboring L2 caches to serve as a makeshift victim cache. Once the L3 cache selects the victim cache, the L3 cache and victim cache perform a request/grant handshake via a private communication, followed by a data-only transfer on a data bus coupling the L3 and L2 caches.

The Former approach suffers from the disadvantage that it lacks a mechanism to track whether a cache line has been previously moved. As such, evicted lines in the Former system can circulate from cache to cache indefinitely, which can cause unnecessary bandwidth costs and hamper system performance. Further, the Former victim cache, the castout target cache, must accept the incoming cache line, which can require the victim cache to evict a cache line that it otherwise would have kept in the cache. As such, the Former approach can enhance the performance of one cache at the expense of another.

In another approach, hereinafter referred to as the Garg approach, illustrated by U.S. Pat. No. 7,076,609, the cores share two L2 caches, splitting the associativity across the L2 caches equally. The PUs share combined replacement controls, such as, for example, for L2 miss detection and handling. Specifically, the Garg approach allocates a new line, retrieved from memory in response to an L2 cache miss, into either of the L2s, depending on the replacement policy at that time. Further, the Garg approach searches both L2 caches simultaneously in response to an L1 miss.

As such, the Garg approach provides a shared, multi-bank level 2 cache, with a wide associativity. The Garg approach therefore also suffers from the disadvantages of a single shared cache. Specifically, Garg line replacement methods must search multiple L2 caches, which increases search time. Further, because the associativity in Garg extends across L2 caches, each Garg L2 cache must be searched whenever any one L2 cache must be searched, not only in the event of a local L2 cache miss. Additionally, because no Garg cache contains all the associativity for a particular congruence class, a cache replacement placed in one L2 cache will still miss in a local L2 not containing the cache line, which would ordinarily hit in a conventional system.

Therefore, there is a need for a system and/or method for cache line replacement selection in a multiprocessor environment that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

It is, therefore, one aspect of the present invention to provide for an improved cache line replacement method.

It is a further aspect of the present invention to provide for an improved cache line replacement system.

It is a further aspect of the present invention to provide for an improved system for cache line replacement in a multiprocessor environment.

It is a further aspect of the present invention to provide for an improved method for cache line replacement in a multiprocessor environment.

It is a further aspect of the present invention to provide for an improved method and system for cache line replacement selection in a multiprocessor environment.

It is a further aspect of the present invention to provide for an improved method and system for managing a cache.

It is a further aspect of the present invention to provide for an improved method and system for managing a cache in a multiprocessor environment.

The aforementioned aspects and other objectives and advantages can now be achieved as described herein. A method for managing a cache operates in a data processing system with a system memory and a plurality of processing units (PUs), each PU having a cache comprising a plurality of cache lines, each cache line having one of a plurality of coherency states, and each PU coupled to at least another one of the plurality of PUs. The method includes determining, by a first PU, that one of a plurality of cache lines in a first cache of the first PU must be replaced with a first data block. The first PU determines whether the first data block is a victim cache line from another one of the plurality of PUs. In the event the first data block is not a victim cache line from another one of the plurality of PUs, the first PU determines whether the first cache contains a cache line in a coherency state of invalid. In the event the first cache contains a cache line in a coherency state of invalid, the first PU stores the first data block in the cache line in a coherency state of invalid and updates the coherency state of the first data block. In the event the first cache does not contain a cache line in a coherency state of invalid, the first PU determines whether the first cache contains a cache line in a coherency state of moved. In the event the first cache contains a cache line in a coherency state of moved, the first PU selects a cache line in a coherency state of moved and stores the first data block in the selected cache line in a coherency state of moved and updates the coherency state of the first data block.

In an alternate embodiment, a method for managing a cache operates in a data processing system with a system memory and a plurality of processing units (PUs), each PU having a cache comprising a plurality of cache lines, each cache line having one of a plurality of coherency states, and each PU coupled to at least another one of the plurality of PUs. The method includes receiving from a first PU, by a second PU, a request to store a first data block from a first cache of the first PU in a second cache of the second PU. The second PU determines whether the first data block matches, in the second cache, a cache line in a coherency state of shared. In the event the first data block matches, in the second cache, a cache line in a coherency state of shared, the second PU accepts the request, without data transfer. In the event the first data block does not match, in the second cache, a cache line in a coherency state of shared, the second PU determines whether the second cache contains a cache line in a coherency state of invalid. In the event the second cache contains a cache line in a coherency state of invalid, the second PU accepts the request, installs the first data block in the same location as the cache line in a coherency state of invalid, and updates the coherency state of the first data block. In the event the second cache does not contain a cache line in a coherency state of invalid, the second PU determines whether the second cache contains a cache line in a coherency state of shared. In the event the second cache contains a cache line in a coherency state of shared, the second PU accepts the request, stores the first data block in the cache line in a coherency state of shared, and updates the coherency state of the first data block. In the event the second cache does not contain a cache line in a coherency state of shared, the second PU determines whether the second cache contains a cache line in a coherency state of moved. In the event the second cache does not contain a cache line in a coherency state of moved, the second PU rejects the request.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
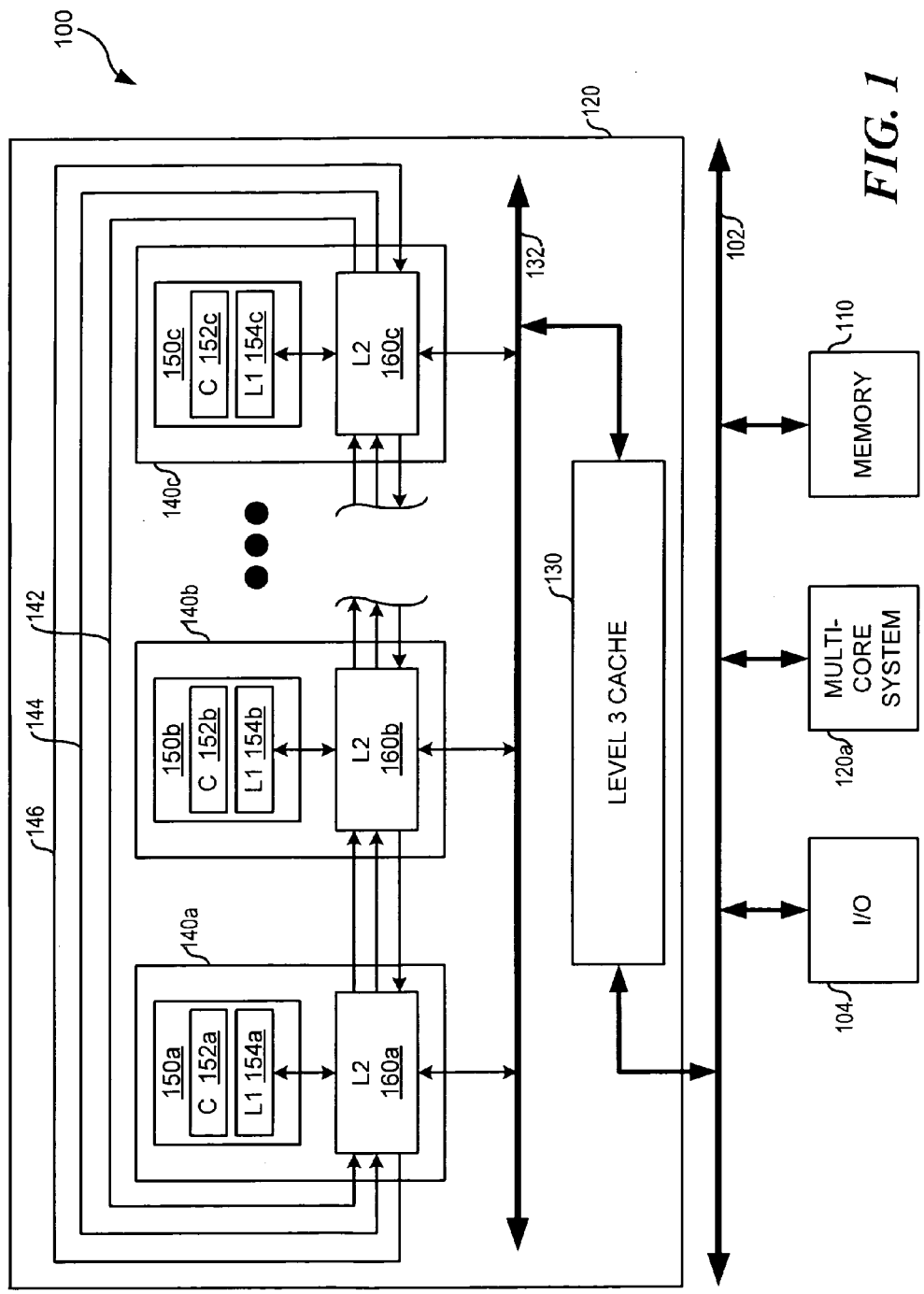
FIG. 1 illustrates a block diagram showing a computer system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved cache coherency, in accordance with a preferred embodiment of the present invention. System 100 comprises a system bus 102.

Generally, system bus 102 is an otherwise conventional computer system bus, modified as described below, to which the various components of system 100 couple. More specifically, computer system 100 includes an input/output (I/O) system 104. I/O system 104 couples to system bus 102 and is an otherwise conventional I/O system, including software and hardware to provide an interface between system 100 and, for example, a user, another computer system, the Internet, or other suitable external entity. Generally, I/O system 104 is the collection of common components and software that make up an input/output system for a modern computer system, not otherwise described herein, as one skilled in the art will understand.

System 100 also includes memory 110. Memory 110 couples to system bus 102 and is an otherwise conventional computer system memory. System 100 also includes one or more multi-core systems (MCS) 120. Generally, as described in more detail below, each MCS 120 is a processor or plurality of processors, including caches and other support hardware, configured to perform typical computer tasks, in accordance with one or more preferred embodiments described herein. In the illustrated embodiment, system 100 includes two MCSs, MCS 120 and MCS 120a. In an alternate embodiment, one MCS 120 can be replaced with a conventional processing unit (PU). One skilled in the art will understand that system 100 can also be configured with more than two MCSs 120, one or more of which can be replaced with a conventional PU. In the illustrated embodiment, MCS 120a represents these various options collectively. Generally, MCS 120 and MCS 120a receive and process data for system 100.

Generally, in the illustrated embodiment, MCS 120 couples to the other components of system 100 through a level 3 (L3) cache 130 coupled to system bus 102. L3 cache 130 is an otherwise conventional L3 cache, modified as described herein, and contains instructions and/or data for processing units (PUs) of MCS 120. L3 cache 130 also couples to a secondary bus 132. Secondary bus 132 is contained entirely within MCS 120, and is an otherwise conventional computer system bus.

MCS 120 includes a plurality of processing units (PUs) 140 that couple to one or more other PUs and to secondary bus 132. In the illustrated embodiment, MCS 120 includes three exemplary PUs 140, PU 140a, PU 140b, and PU 140c, each of which couple to secondary bus 132. Generally, each PU 140 is configured to communicate with L3 cache 130 through secondary bus 132. Further, each PU 140 generally receives data and instructions for processing, processes the received data and instructions, and returns results to one or more other components of system 100.

Each PU 140 couples to one or more other PUs through a plurality of communication channels. FIG. 1 illustrates three such communication channels in an exemplary embodiment. Specifically, each PU 140 in system 100 couples to a downstream PU through an interconnect link 142 and link 144. Similarly, each PU 140 in system 100 couples to an upstream PU through an interconnect link 146. As used herein, "each" means all of a particular subset. Links 142, 144, and 146 are otherwise conventional communication channels, interconnects, or other connection suitable to couple the PUs to each other for data/instruction transfer, control communications, or other suitable operations.

As used herein, the terms "upstream" and "downstream" refer to the PUs in relation to each other, whether organized into a ring, star, or other topology. That is, a target PU receives cast-in cache lines, described in more detail below, from an "upstream" neighboring PU. Similarly, a PU casts out cache lines to a neighboring "downstream" PU. As used herein, a "neighboring PU" is a PU coupled to another PU so as to exchange control information, data, and instructions with the other PU.

Each PU 140 includes a core 150, shown as 150a, 150b, and 150c. Each core 150 includes core logic 152, shown as 152a, 152b, and 152c. Core logic 152 is an otherwise conventional core logic, modified as described herein. Each core logic 152 couples to a dedicated level 1 (L1) cache 154, shown as 154a, 154b, and 154c. L1 cache 154 is an otherwise conventional L1 cache, modified as described herein.

Each core 150 couples to a dedicated level 2 (L2) cache 160, shown as 160a, 160b, and 160c. L2 cache 160 is an otherwise conventional L2 cache, modified as described herein. As described in more detail below, each PU 140 is configured to initiate a cast out of certain cache lines, under certain circumstances, from its own L2 cache 160 to a neighboring PU's L2 cache 160.

For example, in one embodiment, PU 140a casts out a cache line from its L2 cache 160a to downstream PU 140b's L2 cache 160b. L2 cache 160b receives the cache line as a "cast-in" cache line. Similarly, in one embodiment, PU 140c casts out a cache line from its L2 cache 160c to downstream PU 140a's L2 cache 160a. L2 cache 160a receives the cache line as a "cast-in" cache line. Thus, the PUs 140 of MCS 120 are generally configured to cast out cache lines to a neighboring PU's L2 cache, under certain circumstances described in more detail below.

Additionally, exemplary system 100 illustrates the features of the cast-out/cast-in operations described herein with respect to L2-to-L2 transactions. One skilled in the art will understand that the principles of the embodiments disclosed herein can also be applied to operate in L3-to-L3 transactions, L1-to-L1 transactions, and other suitable configurations, with the benefit of the teachings herein. One skilled in the art will also appreciate the need for some mechanism to maintain coherency among the various levels of the cache hierarchy.

While there are a number of modern protocols and techniques for achieving cache coherence, most typical protocols allow only one processor permission to write to a given memory location, as a cache block, at any particular point in time. As such, whenever a PU wishes to write to a memory location, there must be some mechanism to verify with all of the other PUs that the pending write operation is acceptable under the coherency protocol. In one embodiment, the PUs attempt this verification through a "snoop" protocol.

As described above, in one embodiment, the PUs in a multi-core system couple together over a secondary bus (for example, secondary bus 132 of FIG. 1). The PUs communicate over the secondary bus for coherency and other purposes, including, for example, indicating a desire to read from or write to memory locations. When a PU indicates a pending operation on the secondary bus, all the other PUs monitor (or "snoop") the pending operation. The snooping PUs compare the target memory location in the pending operation to the stored memory locations in their respective caches, determining whether the cache states can allow the pending operation and, if so, under what conditions.

In typical modern protocols, and in embodiments of the present invention herein, there are several bus memory transactions that require snooping and follow-up action, as one skilled in the art will understand. A "read with intent to write" for example, requires snooping and follow-up action. Additionally, in some embodiments, there are additional hardware and signaling lines required to support the snoop operations, which are omitted here for clarity.

Thus, generally, in order to maintain cache coherence, whenever a PU wishes to read or write a memory block, it must indicate that desire to the other PUs in the system. The cache coherence protocol therefore includes a status indicator indicating the current coherency "state" of the block, with each cache block in each level having its own state. For example, if only one PU has an active copy of a cache block, that PU marks the block as being in a coherency state of "exclusive," subject to additional protocol requirements described in more detail below. Generally, PUs can write to an exclusive cache block without first communicating with other PUs in the system because no other processing unit has a copy of that cache block.

Additionally, in some instances, PUs can retrieve requested cache blocks directly from neighboring PUs, instead of from main memory, in an "intervention" operation. As such, the source PU can transfer the requested cache block to the requesting PU without causing coherency problems, and without first writing the cache block to memory.

Generally, as used herein, a "coherency state" refers to one of a plurality of states representing the relationship between data stored in a cache and data stored in memory and in other caches. To reduce confusion, the discussion herein refers to cache lines or cache blocks as being "in a coherency state of X" or "in coherency state X," where X indicates a coherency state associated with the cache line/block. This serves to distinguish an invalid coherency state (a coherency state not defined by the coherency protocol), from an invalid cache line (a cache line with invalid data). For example, a "coherency state of Shared(moved)" is an invalid coherency state in the coherency protocol described herein, whereas a "coherency state of invalid" is a valid coherency state.

Figure 2:
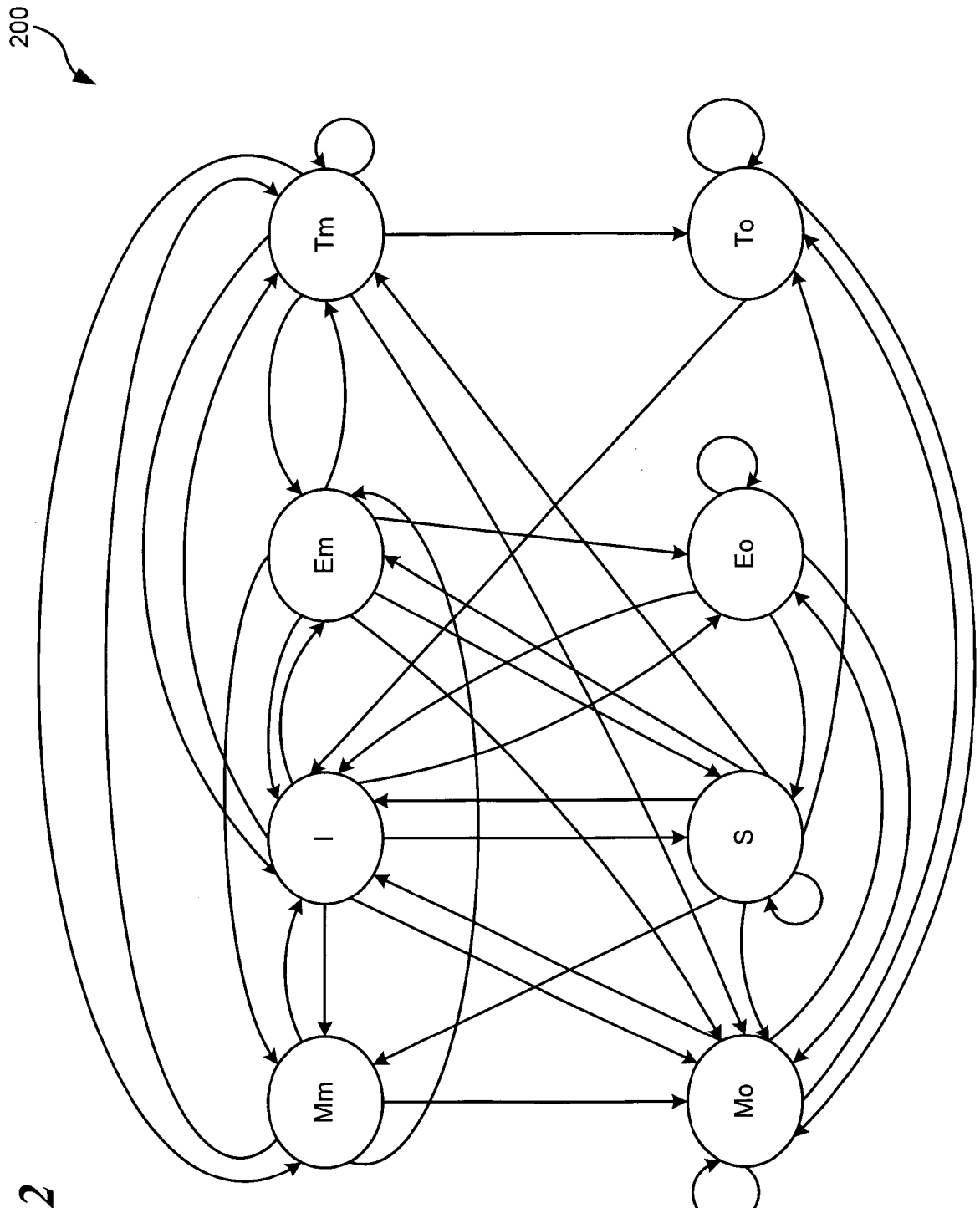
FIG. 2 illustrates a high-level state diagram depicting logical states of an improved cache coherency protocol, which can be implemented in accordance with a preferred embodiment.

FIG. 2 illustrates one embodiment of a plurality of valid coherency states in an improved cache coherency protocol. Specifically, FIG. 2 illustrates a high-level state diagram 200 depicting logical states of an improved cache coherency protocol, which can be implemented in accordance with a preferred embodiment.

Diagram 200 illustrates eight valid coherency states: Modified(moved) ("Mm"), Modified(owned) ("Mo"), Invalid ("I"), Shared ("S"), Exclusive(moved) ("Em"), Exclusive(owned) ("Eo"), Tagged(moved) ("Tm"), and Tagged(owned) ("To"). Generally, states Mm, Mo, I, S, Em, and Eo are configured as the well-known MESI protocol states "Moved," "Exclusive," "Shared," and "Invalid," except as modified herein.

Generally, state Mo indicates that the cache line is valid and contains modified data. Copies of this line do not and cannot exist in any other cache. The local PU has accessed this cache line. The local PU is the PU that includes the cache storing this cache line.

Generally, state Mm indicates that the cache line is valid and contains modified data. Copies of this line do not and cannot exist in any other cache. The local PU has not accessed this cache line. Further, this cache line was received by the local PU as a cast-in cache line, from a neighboring PU that cast out the cache line.

Generally, state Eo indicates that the cache line is valid and contains unmodified data, that is, the data matches data stored in memory. Copies of this line do not and cannot exist in any other cache. The local PU has accessed this cache line.

Generally, state Em indicates that the cache line is valid and contains unmodified data. Copies of this line do not and cannot exist in any other cache. The local PU has not accessed this cache line. Further, this cache line was received by the local PU as a cast-in cache line, from a neighboring PU that cast out the cache line.

Generally, state S indicates that the cache line is valid and copies of this line may exist in other caches. In the illustrated embodiment, state S indicates only that the cache line is valid and that other copies may exist. In an alternate embodiment, state S includes a sub-state, Shared(last) ("S(I)") indicating that the cache line is the most-recently accessed of the copies of the cache line. The S(I) state facilitates data intervention of lines in the "shared" state.

Generally, state I indicates that the cache line is not valid in the current cache. Copies of the cache line may exist in other caches, in various other states.

Generally, state To indicates that the cache line is valid and contains modified data. A PU has sent at least one copy of this cache line to another PU's cache though an intervention operation. The local PU has accessed this cache line. One skilled in the art will recognize that state To is an extension to the well-known MESI cache coherency protocol. Generally, a "tagged" state indicates that the PU holding the tagged cache line is responsible for writing the modified cache line back to the memory hierarchy at some time in the future. The PU holding the tagged cache line can satisfy its responsibility by writing back to system memory or by passing the tag to another PU.

Generally, state Tm indicates that the cache line is valid and contains modified data. A PU has sent at least one copy of this cache line to another PU's cache though an intervention operation. Further, this cache line was received by the local PU as a cast-in cache line, from a neighboring PU that cast out the cache line. The local PU has not accessed this cache line.

Companion application Ser. No. 11/959,793, filed concurrently herewith, describes in additional detail the unique coherency protocols that can be configured to operate in conjunction with embodiments disclosed herein.

Figure 3:
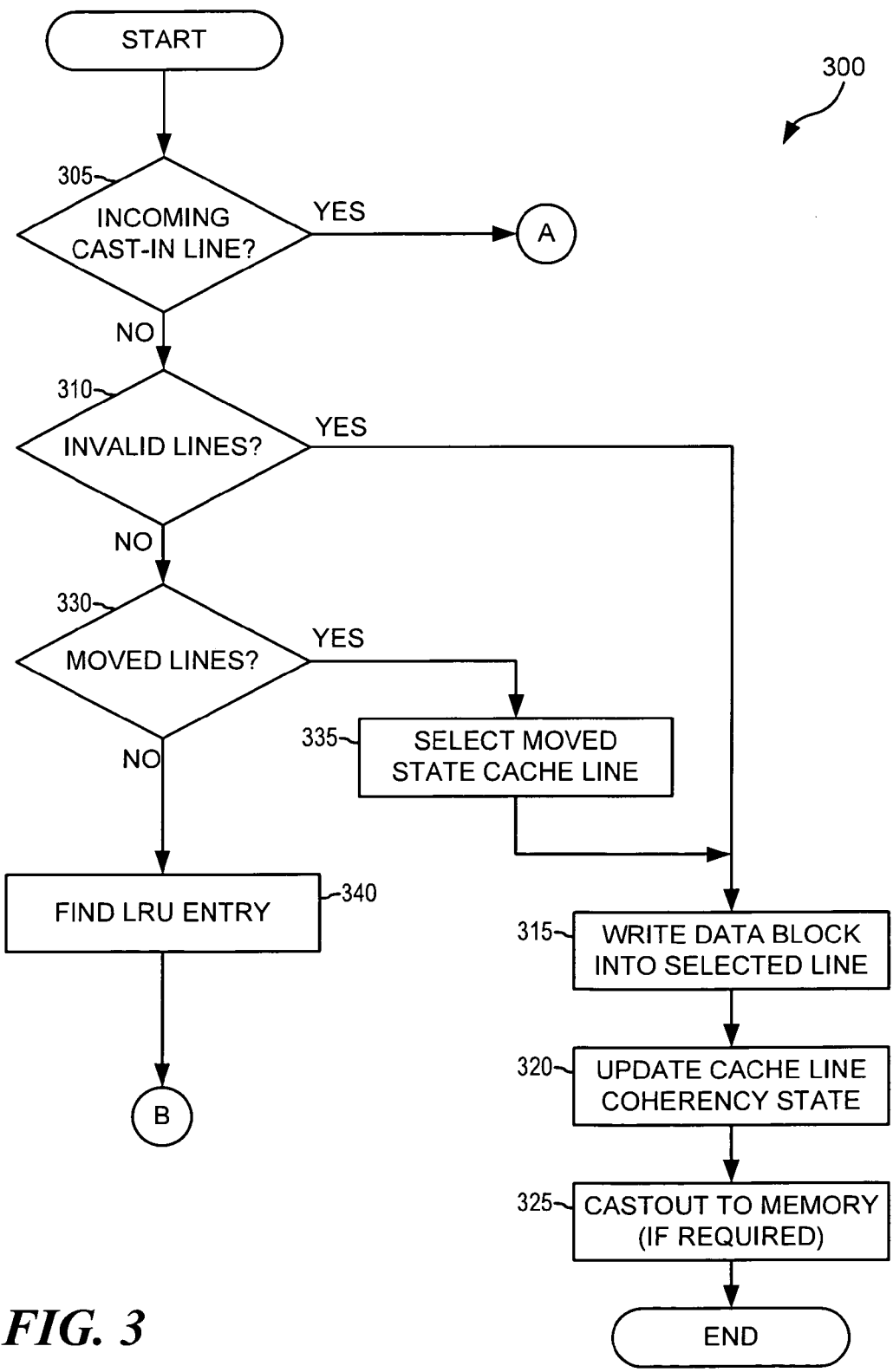
FIG. 3 illustrates a high-level flow diagram depicting logical operational steps of an improved cache line replacement method, which can be implemented in accordance with a preferred embodiment.

FIG. 3 illustrates one embodiment of a method for cache line replacement and cache line replacement selection. Specifically, FIG. 3 illustrates a high-level flow chart 300 that depicts logical operational steps performed by, for example, system 100 of FIG. 1 implementing coherency protocol 200 of FIG. 2, which may be implemented in accordance with a preferred embodiment. Generally, MCS 120 of FIG. 1 performs the steps of the method, unless indicated otherwise.

For example, in one embodiment, each PU 140 can perform the steps of the method. Specifically, each PU 140 performs the steps of the method whenever the PU 140 determines that it must select a cache line to replace, in order to make room for an incoming cache line. In one embodiment, one or more PUs 140 perform the steps of the method in response to a determination that one of the existing cache lines of the L2 cache 160 must be selected for replacement in order to make room for an incoming cache line. In one embodiment, core module 150 performs the steps of the method. For ease of illustration, however, the following discussion assumes PU 140 of MCS 120 performs the steps of the method, except as indicated otherwise.

As illustrated at block 305, the process begins, wherein PU 140 determines whether the incoming cache line, which will replace the cache line selected for replacement, is an incoming cast-in cache line from a neighboring PU. If at block 305 the incoming cache line is a cast-in cache line, the process continues along the YES branch to marker "A," described in more detail below in association with FIG. 5. If at block 305 the incoming cache line is not a cast-in cache line, the process continues along the NO branch to block 310.

As illustrated at decisional block 310, PU 140 determines whether there are any cache lines in the L2 cache 160 of PU 140 that are in a coherency state of invalid. If at block 310 there are cache lines in the L2 cache 160 that are in a coherency state of invalid, PU 140 selects one such cache line and the process continues along the YES branch to block 315.

Next, as illustrated at block 315, PU 140 writes the incoming cache line data block into the cache location of the selected cache line of L2 cache 160. Next, as illustrated at block 320, PU 140 updates the cache coherency state information associated with the selected cache line to indicate the status of the cache line with the newly received data block. Next, as illustrated at block 325, PU 140 casts out the cache line previously stored in the cache line currently occupied by the cast-in cache line, if any, and the process ends. One skilled in the art will understand that cache lines in the coherency state of invalid do not need to be cast out to memory. As such, where the vacating cache line does not require cast out to memory, PU 140 skips this step, and the process ends. As used herein, "updating the cache coherency state information" is equivalent to "updating the cache coherency status" and "updating the cache coherency state."

If at decisional block 310 there are no cache lines in the L2 cache 160 that are in a coherency state of invalid, the process continues along the NO branch to decisional block 330. As illustrated at decisional block 330, PU 140 determines whether there are any cache lines in the L2 cache 160 of PU 140 that are in a coherency state of moved. If at decisional block 330 there are cache lines in the L2 cache 160 that are in a coherency state of moved, the process continues along the YES branch to block 335.

As illustrated at block 335, PU 140 selects for replacement a cache line in the coherency state of moved in the PU's L2 cache 160. In one embodiment, PU 140 selects any one of the cache lines in the coherency state of moved. In an alternate embodiment, PU 140 selects from among several cache lines in the coherency state of moved, according to a pre-determined preference. In one embodiment, the pre-determined preference is for PU 140 to select a cache line in the coherency state of Tm before cache lines in the coherence state of Em, and to select cache lines in the coherency state of Em before cache lines in the coherence state of Mm.

Next, as indicated at block 315, PU 140 writes the incoming cache line data block into the cache location of the selected cache line of L2 cache 160. Next, as illustrated at block 320, PU 140 updates the cache coherency state information associated with the selected cache line to indicate the status of the cache line with the newly received data block. Next, as illustrated at block 325, PU 140 casts out the cache line previously stored in the cache line currently occupied by the cast-in cache line, if required, and the process ends. In one embodiment, PU 140 writes back the data from the vacating cache line. In one embodiment, PU 140 writes the vacating cache line into a write back buffer. Alternatively, where the vacating cache line does not require cast out to memory, PU 140 skips this step. Generally, in one embodiment, PU 140 casts out replaced cache lines in the coherency states of Tm and Mm, and PU 140 discards replaced cache lines in the coherency state of Em.

Further, in some embodiments, a PU selects for replacement moved cache lines from an upstream neighboring PU before other moved cache lines. Among moved cache lines, the PU selects Tm cache lines for replacement first because such lines may exist in other caches, which is faster than retrieval from memory, should a PU require the cache line again. Next, the PU selects Em cache lines because such cache lines are not modified and therefore do not require cast out to memory, which also eliminates unnecessary bus transactions. Next, the PU selects Mm cache lines because such cache lines do not exist in other caches, and require a subsequent cast out, or write back, operation.

If at decisional block 330 there are no cache lines in the L2 cache 160 that are in a coherency state of moved, the process continues along the NO branch to block 340. As illustrated at block 340, PU 140 identifies or otherwise determines which cache line of L2 cache 160 is the least-recently-used (LRU) cache line. One skilled in the art will understand that there are a variety of well-known methods to determine a LRU cache line. The process continues to marker "B," of FIG. 4.

Figure 4:
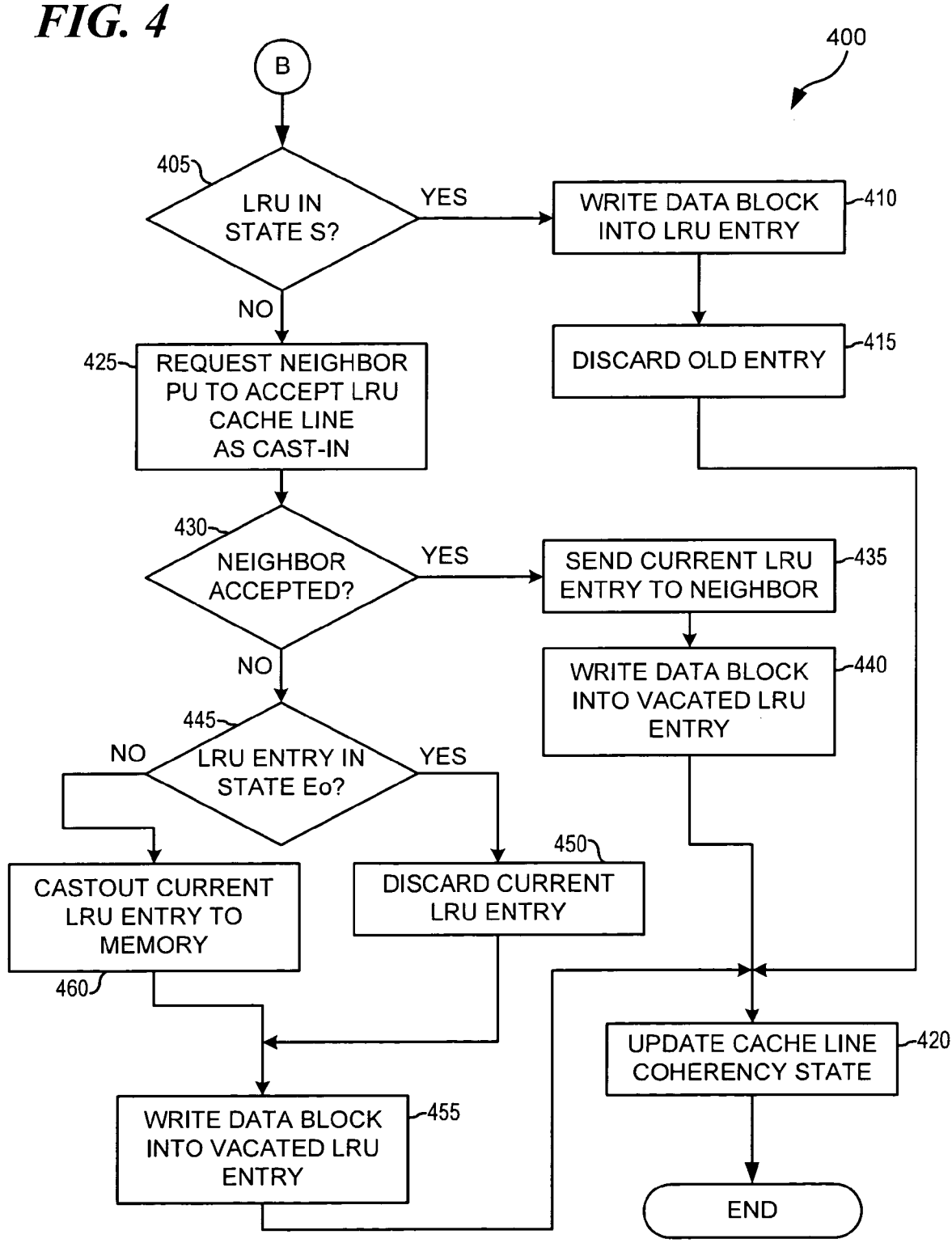
FIG. 4 illustrates a high-level flow diagram depicting logical operational steps of an improved cache line replacement method, which can be implemented in accordance with a preferred embodiment.

FIG. 4 illustrates one embodiment of a method for cache line replacement and cache line replacement selection. Specifically, FIG. 4 illustrates a high-level flow chart 400 that depicts logical operational steps performed by, for example, system 100 of FIG. 1 implementing coherency protocol 200 of FIG. 2, which may be implemented in accordance with a preferred embodiment.

The process continues from Marker "B" to decisional block 405. As illustrated at decisional block 405, PU 140 determines whether the LRU cache line is in a coherency state of shared. If at decisional block 405 the LRU cache line is in a coherency state of shared, the process continues along the YES branch to block 410. As illustrated at block 410, PU 140 writes the incoming cache line into the cache location of the LRU cache line.

Next, as illustrated at block 415, PU 140 discards the LRU cache line that was replaced to make room for the incoming cache line. One skilled in the art will understand that, in an alternate embodiment, PU 140 discards the LRU cache line before writing the incoming cache line to the cache location vacated by the discarded LRU cache line. Next, as illustrated at block 420, PU 140 updates the cache line coherency state in response to writing the incoming cache line and the process ends.

If at decisional block 405 the LRU cache line is not in a coherency state of shared, the process continues along the NO branch to block 425. As illustrated at block 425, PU 140 requests a neighboring PU to accept the LRU cache line as an incoming cast-in. As described above, PU 140 can request an upstream and/or downstream neighboring PU to accept the LRU cache line as an incoming cast-in cache line. In a preferred embodiment, each PU 140 requests only downstream PUs to accept expelled cache lines as incoming cast-in cache lines.

Next, as illustrated at decisional block 430, PU 140 determines whether the queried neighboring PU accepted the LRU cache line as an incoming cast-in. If at decisional block 430, the neighboring PU accepted the LRU cache line as an incoming cast-in, the process continues along the YES branch to block 435.

As illustrated at block 435, PU 140 sends the LRU cache line to the accepting neighboring PU. In one embodiment, PU 140 sends the LRU cache line data to the neighboring PU by transferring data from its L2 cache 160 to the neighboring PU's L2 cache 160. In an alternate embodiment, where the neighboring PU already has a copy of the LRU cache line, described in more detail below, PU 140 does not transfer any data to the neighboring PU.

Next, as illustrated at block 440, PU 140 writes the incoming cache line data block into the cache location vacated by the LRU cache block. Next, PU 140 updates the cache line coherency state, as illustrated at block 420, and the process ends.

If at decisional block 430, the neighboring PU did not accept the LRU cache line as an incoming cast-in, the process continues along the NO branch to decisional block 445. As illustrated at decisional block 445, PU 140 determines whether the LRU cache line is in a coherency state Eo.

If at decisional block 445 the LRU cache line is in coherency state Eo, the process continues along the YES branch to block 450. As illustrated at block 450, PU 140 discards the current LRU cache line entry. In one embodiment, PU 140 clears the current LRU cache line cache location. In an alternate embodiment, PU 140 overwrites the current LRU cache line with the incoming cache line, without writing the current LRU cache line to, for example, a write-back buffer.

Next, as illustrated at block 455, PU 140 writes the incoming cache line data block into the cache location vacated by the LRU cache line. Next, PU 140 updates the cache line coherency state, as illustrated at block 420, and the process ends.

If at decisional block 445 the LRU cache line is not in coherency state Eo, the process continues along the NO branch to block 460. As illustrated at block 460, PU 140 casts out the current LRU cache line entry to memory. In one embodiment, PU 140 casts out the current LRU cache line to L3 cache 130. In an alternate embodiment, PU 140 casts out the current LRU cache line by writing the current LRU cache line to, for example, a write-back buffer. In an alternate embodiment, PU 140 casts out the current LRU cache line by writing the cache line to main memory 110.

Next, as illustrated at block 455, PU 140 writes the incoming cache line data block into the cache location vacated by the LRU cache line. Next, PU 140 updates the cache line coherency state, as illustrated at block 420, and the process ends.

Figure 5:
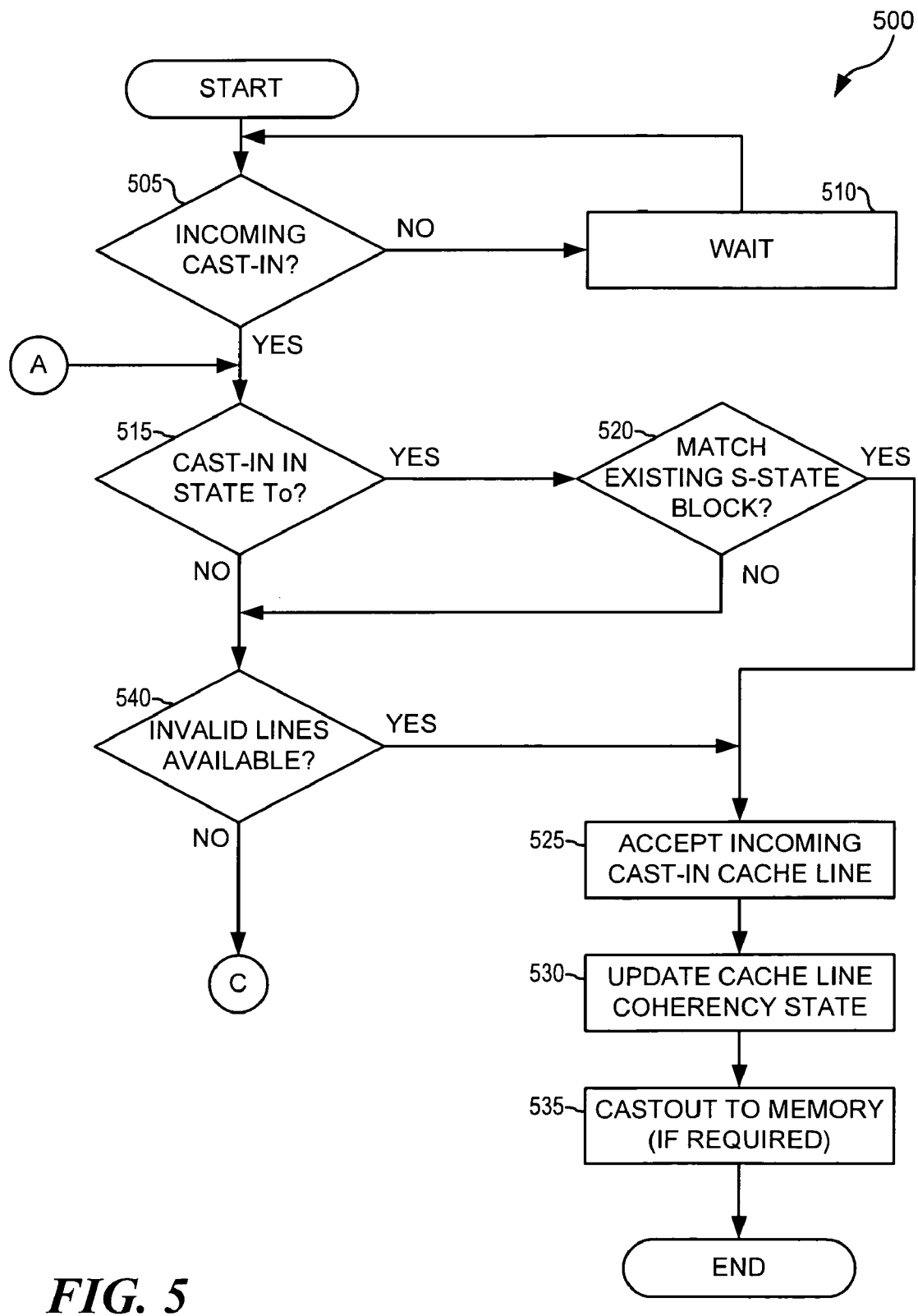
FIG. 5 illustrates a high-level flow diagram depicting logical operational steps of an improved cache management method, which can be implemented in accordance with a preferred embodiment.
Figure 6:
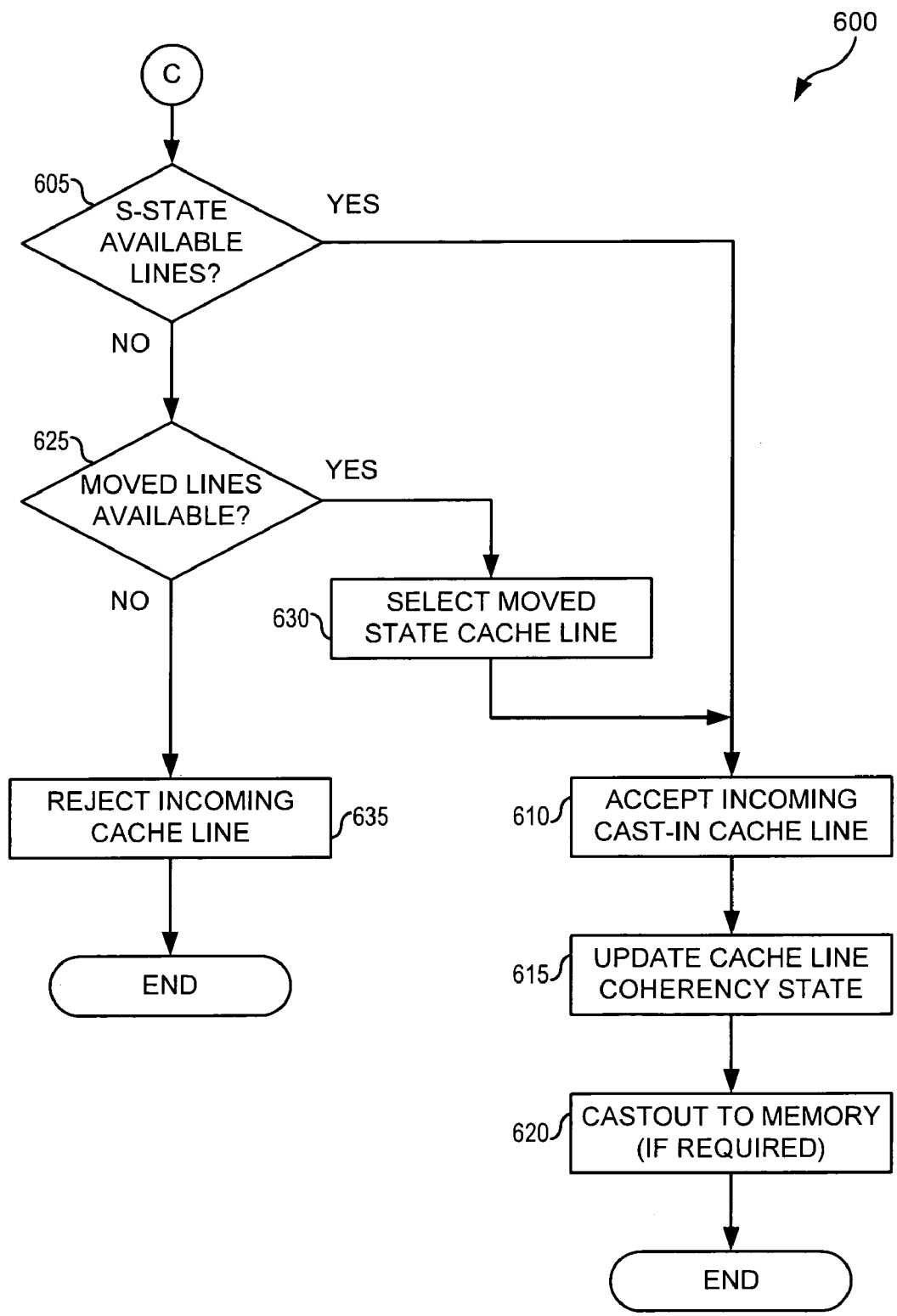
FIG. 6 illustrates a high-level flow diagram depicting logical operational steps of an improved cache management method, which can be implemented in accordance with a preferred embodiment.

Accordingly, the method illustrated in FIGS. 3 and 4 provides an improved mechanism to select a cache line for replacement, from among a plurality of cache lines, in order to make room for an incoming cache line. FIGS. 5 and 6 illustrate an improved mechanism that can be used by a PU to determine whether to accept an incoming cast-in line. One skilled in the art will understand that a PU can perform the steps of one or more of the illustrated embodiments of methods concurrently and/or in alternate orders.

FIG. 5 illustrates one embodiment of a method for determining whether to accept an incoming cast-in cache line and for cache line replacement selection. Specifically, FIG. 5 illustrates a high-level flow chart 500 that depicts logical operational steps performed by, for example, system 100 of FIG. 1 implementing coherency protocol 200 of FIG. 2, which may be implemented in accordance with a preferred embodiment.

The process begins at decisional block 505. As illustrated at decisional block 505, PU 140 determines whether there is an incoming cast-in cache line. If at decisional block 505 there is not an incoming cast-in cache line for the PU, the process continues along the NO branch to block 510. As illustrated at block 510, the PU waits and the process returns to decisional block 505. One skilled in the art will understand that PU 140 can perform other tasks simultaneously with waiting as indicated in block 510. In one embodiment, block 505 incorporates block 510, and PU 140 tests each incoming cache line to determine whether the incoming cache line is a cast-in cache line.

If at decisional block 505 there is an incoming cast-in cache line for the PU, or the incoming cache line is a cast-in cache line, the process continues along the YES branch to block 515. The process also continues from marker "A" to decisional block 515. As described above, marker "A" represents a PU's determination that an incoming cache line is an incoming cast-in line from a neighboring PU. As illustrated at decisional block 515, PU 140 determines whether the incoming cast-in cache line is in a coherency state of To.

If at decisional block 515 the incoming cast-in cache line is in a coherency state of To, the process continues along the YES branch to decisional block 520. As illustrated at decisional block 520, PU 140 determines whether the cast-in cache line matches a cache line already in the PU's L2 cache 160, and if so, whether that cache line is in a coherency state of shared.

If at decisional block 520 the cast-in cache line matches a cache line in the PU's L2 cache 160 and that cache line is in a coherency state of shared, the process continues along the YES branch to block 525. As indicated at block 525, PU 140 accepts the incoming cast-in cache line. Generally, PU 140 accepts the incoming cast-in cache line by writing the incoming cast-in cache line data block to a cache line at a cache location in the PU's L2 cache 160. In one embodiment, PU 140 accepts the incoming cast-in cache line by indicating to the requesting PU that PU 140 already has a copy of the data in its cache, and that no data transfer is necessary. In one embodiment, PU 140 accepts the cast-in cache line by raising or otherwise generating an accept signal, followed by a data transfer into the PU's L2 cache 160.

Co-pending application Ser. No. 11/959,652, filed concurrently herewith, provides additional details as to the interface and communication methods between neighboring PUs, among other novel features.

Next, as illustrated at block 530, PU 140 updates the cache line coherency state of the cache line to which the PU 140 wrote the cast-in cache line. Next, as illustrated at block 535, PU 140 casts out the cache line previously stored in the cache line currently occupied by the cast-in cache line, if any, and the process ends. That is, in one embodiment, PU 140 writes back the data from the vacating cache line. In one embodiment, PU 140 writes the vacating cache line into a write back buffer. Alternatively, if the cast-in cache line in coherency state To matches a cache line in coherency state S in the PU's L2 cache 160, PU 140 skips this step. Alternatively, where the vacating cache line does not require cast out to memory, PU 140 skips this step.

If at decisional block 520 the cast-in cache line does not match a cache line in the PU's L2 cache 160 or a matching cache line is not in a coherency state of shared, the process continues along the NO branch to decisional block 540. Similarly, if at decisional block 515 the cast-in cache line is not in a coherency state of To, the process continues along the NO branch to decisional block 540.

As illustrated at decisional block 540, PU 140 determines whether there are any cache lines in the coherency state of invalid in the PU's L2 cache 160. If at decisional block 540 there is a cache line in the coherency state of invalid available in the PU's L2 cache 160, PU 140 selects for replacement a cache line in the coherency state of invalid and the process continues along the YES branch to block 525. As described above, PU 140 accepts the incoming cast-in cache line and writes the cache line data to the selected cache line (block 525), updates the cache line coherency state (block 530), casts out the vacating cache line to memory, if necessary (block 535) and the process ends.

If at decisional block 540 there is not a cache line in the coherency state of invalid available in the PU's L2 cache 160, the process continues along the NO branch to Marker "C", of FIG. 6.

FIG. 6 illustrates one embodiment of a method for determining whether to accept an incoming cast-in cache line and for cache line replacement selection. Specifically, FIG. 6 illustrates a high-level flow chart 600 that depicts logical operational steps performed by, for example, system 100 of FIG. 1 implementing coherency protocol 200 of FIG. 2, which may be implemented in accordance with a preferred embodiment.

The process continues from Marker "C" to decisional block 605. As illustrated at decisional block 605, PU 140 determines whether there are any cache lines in the coherency state of shared in the PU's L2 cache 160. If at decisional block 605 there is a cache line in the coherency state of shared in the PU's L2 cache 160, PU 140 selects for replacement a cache line in the coherency state of shared and the process continues along the YES branch to block 610.

As illustrated at block 610, PU 140 accepts the incoming cast-in cache line as described with respect to block 525 of FIG. 5, above. Next, as illustrated at block 615, PU 140 updates the cache line coherency state as described with respect to block 530 of FIG. 5, above. Next, as illustrated at block 620, PU 140 casts out the vacating cache line to memory, if required, as described with respect to block 535 of FIG. 5, above, and the process ends.

If at decisional block 605 there are no cache lines in the coherency state of shared in the PU's L2 cache 160, the process continues along the NO branch to block 625. As illustrated at decisional block 625, PU 140 determines whether there are any cache lines in the coherency state of moved in the PU's L2 cache 160. If at decisional block 625 there are any cache lines in the coherency state of moved in the PU's L2 cache 160, the process continues along the YES branch to block 630.

As illustrated at block 630, PU 140 selects for replacement a cache line in the coherency state of moved in the PU's L2 cache 160. In one embodiment, PU 140 selects any one of the cache lines in the coherency state of moved. In an alternate embodiment, PU 140 selects from among several cache lines in the coherency state of moved, according to a pre-determined preference. In one embodiment, the pre-determined preference is for PU 140 to select a cache line in the coherency state of Tm before cache lines in the coherence state of Em, and to select cache lines in the coherency state of Em before cache lines in the coherence state of Mm.

Next, as described above, PU 140 accepts the incoming cast-in cache line and writes the cache line data to the selected cache line (block 610), updates the cache line coherency state (block 615), casts out the vacating cache line to memory, if necessary (block 620) and the process ends. Generally, in one embodiment, PU 140 casts out replaced cache lines in the coherency states of Tm and Mm, and PU 140 discards replaced cache lines in the coherency state of Em.

If at decisional block 625 there are not any cache lines in the coherency state of moved in the PU's L2 cache 160, the process continues along the NO branch to block 635. As illustrated at block 635, PU 140 rejects the incoming cast-in cache line and the process ends. In one embodiment, PU 140 rejects the incoming cache line by asserting a reject signal. In an alternate embodiment, PU 140 rejects the incoming cache line by de-asserting an accept signal. In an alternate embodiment, PU 140 rejects the incoming cache line and instructs the requesting PU to try again later.

Thus, generally, system 100 of FIG. 1, implementing state diagram 200 of FIG. 2, in one embodiment, provides a novel system and method for cache line replacement selection in a multiprocessor environment. That is, the embodiments disclosed herein extend the well-known LRU replacement algorithm in conjunction with a novel coherency protocol and interface.

More particularly, the embodiments disclosed herein allow a PU to discard previously "moved" cache lines before the PU's own cache lines. Additionally, if the PU does not have any "moved" lines, certain embodiments disclosed herein allow a PU to cast out the PU's "owned" lines to a downstream neighboring PU, which PU can receive the cast out cache lines as incoming "cast-in" cache lines.

Broadly, in some embodiments, a PU can prioritize cache line replacement for load or store instructions by first selecting invalid cache lines for replacement, as invalid cache lines are empty and no cast out or line discard is needed. Second, the PU selects moved cache lines because such lines have not been used by the local PU and are typically held only to improve the performance of the PU's upstream neighboring PU's cache. Third, the PU selects lines as determined through an otherwise conventional LRU algorithm, modified as described above. One skilled in the art will understand that, generally, the PUs do not consider locked cache lines for replacement.

Further, in some embodiments, a PU selects for replacement moved cache lines from an upstream neighboring PU before other moved cache lines. Among moved cache lines, the PU selects Tm cache lines for replacement first because such lines may exist in other caches, which is faster than retrieval from memory, should a PU require the cache line again. Next, the PU selects Em cache lines because such cache lines are not modified and therefore do not require cast out to memory, which also eliminates unnecessary bus transactions. Next, the PU selects Mm cache lines because such cache lines do not exist in other caches, and require a subsequent cast out, or write back, operation.

Where the PU's L2 cache does not contain moved cache lines, the PU uses an LRU algorithm to select a cache line. If the PU selects an owned cache line, the PU attempts to cast out the evicted cache line to a downstream neighboring PU instead of to memory. Thus, in one embodiment, generally, for cast out cache lines, the PU discards moved cache lines ahead of lines in any other coherency state except invalid, which gives preference to the PU's own cache lines. For cast-in cache lines, the PU replaces moved cache lines after shared cache lines and invalid cache lines. In one embodiment, the PU selects a shared line to be replaced before a moved line because a copy of the line is likely to exist in another L2 cache and because no castout would be needed.

Moreover, one skilled in the art will recognize that the embodiments disclosed herein support various modifications. For example, in one embodiment, a PU replaces Tm cache lines before Em cache lines when accepting a cast-in cache line from an upstream neighboring PU, because the potential faster reuse of the Tm line (which can reside in other PU's caches) is typically more important than the reduced bus traffic offered by selecting the Em cache line, as the PU can discard the Em cache line with no bus transaction. In an alternate embodiment, particularly where reduced bus traffic is a higher priority than quicker cache line reuse, the PU can discard Em cache lines ahead of Tm cache lines.

In some of the illustrated embodiments, a PU can accept an Mo cache line as a cast-in to replace an Mm cache line, if the PU has only Mm moved cache lines available for replacement. In an alternate embodiment, the PU can reject an Mo cache line as a cast-in where the PU's cache contains only Mm moved cache lines available for replacement. This embodiment trades the advantage of reduced bus transactions for the small disadvantage of casting out to memory a more recently used cache line. That is, this embodiment requires only one bus transaction (the upstream PU casting out the rejected Mo cache line to memory), whereas the illustrated embodiments otherwise incur two bus transactions (the upstream PU casting out the cache line to the downstream PU, and the downstream PU casting out the replaced Mm cache line to memory).

Accordingly, the disclosed embodiments provide numerous advantages over prior art methods and systems. For example, the disclosed cache line replacement selection method improves performance over the standard LRU replacement algorithm. Additionally, multi-core systems implementing the disclosed methods can expand the resources available to a single PU's L2 (or other) cache. Accordingly, the disclosed coherency protocol supports casting out lines from one PU cache into another PU cache, by improving the cache line replacement selection in such a system.

In another technical advantage, the additional states available in the novel coherency protocol help the PUs to optimize both their replacement algorithms and the mechanism by which cache lines are accepted for cast-in. By distinguishing between cache lines that are "owned" and cache lines that have only been "moved" into a local PU cache, the local PU can provide supplemental cache space to a neighboring PU, without also sacrificing the local PU's performance.

In another technical advantage, distinguishing between "moved" and "owned" cache lines assists in preventing a cache line from passing from neighboring PU to neighboring PU to neighboring PU and so on. That is, in one embodiment, "moved" cache lines are not permitted to be cast out to a neighboring PU's cache. The PUs instead replace or invalidate moved cache lines ahead of owned cache lines, thereby preventing unwanted cache lines from circulating indefinitely. This mechanism relieves the system caches from filling up with unwanted cache lines and helps prevent system performance degradation.

In another technical advantage, the novel embodiments disclosed herein help extend the performance of otherwise degraded multiple-core systems. For example, in one embodiment, where manufacturing tests discover certain types of partially-good chips, the disclosed embodiments can support improved neighboring cache usage that can be sufficient to meet performance requirements that salvage the otherwise unsuitable chip. Additionally, the novel embodiments disclosed herein can help a partially degraded chip to remain useful beyond situations that would be catastrophic for prior art systems. For example, where one PU or core malfunctions after some period of time in service, the remaining cores can continue to use the broken core's cache. In some cases, continued neighboring cache usage can offset a significant segment of the performance impact of losing a core, which can be sufficient to extend the service life of the chip.

In still another technical advantage, the disclosed embodiments prioritize moved lines over owned lines when selecting which cache line to discard/cast out, which allows each PU to retain full use of its own cache, which improves performance, flexibility, and reliability. Further, casting out owned lines to downstream neighboring PU caches instead of to memory improves overall throughput, particularly when the downstream neighboring PU's core is powered down or otherwise disabled. Moreover, the PUs can generally retrieve cache lines from a neighboring PU's L2 cache more quickly than from main memory, which also improves performance.

The disclosed cache line replacement selection methods and systems also offer particular advantages over specific prior art systems and methods. For example, in contrast to the Former approach, the disclosed coherency protocol herein can move a tagged line to a neighboring PU cache in the shared state, with no data traffic required. Additionally, because the Former approach lacks the novel "moved" and "owned" states described herein, Former systems cannot employ such states to prevent endless circulation of old cache lines.

Additionally, Former PUs cannot refuse to accept cast out cache lines as cast-in cache lines. In the disclosed cache line replacement selection protocols, a local PU can refuse to accept cast out cache lines until the local PU has sufficient room in the form of a cache line in a coherency state of invalid, shared, or one of the moved states. Thus, unlike the Former approach, the present invention does not improve one PU's cache performance at the cost of degrading another PU's cache performance.

Similarly, the present invention offers numerous advantages over the Garg approach. Because the present invention supports improved cache line cast out and retrieval protocols, such systems are improvements over the Garg approach, and the Garg approach suffers from the disadvantages of a single shared cache, including low scalability. Further, the disclosed cache line replacement selection protocols support reduced cache miss searching, as line replacement protocols in systems employing the present invention can restrict cache searches to the local L2 cache, instead of multiple L2 caches.

As such, the present invention improves cache performance generally, over the Garg approach and other prior art systems and methods.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for managing a cache in a data processing system with a system memory and a plurality of processing units (PUs), each PU having a cache comprising a plurality of cache lines, each cache line having one of a plurality of coherency states, and each PU coupled to at least another one of the plurality of PUs, the method comprising:

determining, by a first PU, that one of a plurality of cache lines in a first cache of the first PU must be replaced with a first data block;

determining, by the first PU, whether the first data block is a victim cache line from another one of the plurality of PUs;

in the event the first data block is not a victim cache line from another one of the plurality of PUs, determining, by the first PU, whether the first cache contains a cache line in a coherency state of invalid;

in the event the first cache contains a cache line in a coherency state of invalid, storing the first data block in the cache line in a coherency state of invalid and updating the coherency state of the first data block;

in the event the first cache does not contain a cache line in a coherency state of invalid, determining, by the first PU, whether the first cache contains a cache line in a coherency state of moved;

in the event the first cache contains a cache line in a coherency state of moved, selecting a cache line in a coherency state of moved and storing the first data block in the selected cache line in a coherency state of moved and updating the coherency state of the first data block;

in the event the first cache contains a cache line in a coherency state of moved, determining, by the first PU, whether the first cache contains more than one cache line in a coherency state of moved;

in the event the first cache contains more than one cache line in a coherency state of moved, selecting as a victim cache line a cache line in a coherency state of moved and tagged before any other coherency state, and selecting as a victim cache line a cache line in a coherency state of moved and exclusive before a cache line in a coherency state of moved and modified; and storing the first data block in the victim cache line and updating the coherency state of the first data block.

2. The method of claim 1, further comprising casting out to memory the selected cache line in a coherency state of moved.

3. The method of claim 1, further comprising:

in the event the first cache does not contain a cache line in a coherency state of moved, determining, by the first PU, the least-recently-used (LRU) cache line in the first cache;

determining, by the first PU, whether the LRU cache line is in a coherency state of shared; and in the event the LRU cache line is in a coherency state of shared, storing the first data block in the LRU cache line and updating the coherency state of the first data block.

4. The method of claim 3, further comprising:

in the event the LRU cache line is not in a coherency state of shared, determining whether the LRU cache line is in a coherency state of owned; and in the event the LRU cache line is in a coherency state of owned, requesting another one of the plurality of PUs to accept the LRU cache line.

5. The method of claim 4, further comprising:

in the event another one of the plurality of PUs accepts the LRU cache line, sending the LRU cache line to the accepting PU; and storing the first data block in the first cache location vacated by the LRU cache line and updating the coherency state of the first data block.

6. The method of claim 4, further comprising:

in the event another one of the plurality of PUs rejects the LRU cache line, determining, by the first PU, whether the LRU cache line is in a coherency state of exclusive;

in the event the LRU cache line is not in a coherency state of exclusive, casting out LRU cache line to memory; and storing the first data block in the first cache location vacated by the LRU cache line and updating the coherency state of the first data block.

7. A method for managing a cache in a data processing system with a system memory and a plurality of processing units (PUs), each PU having a cache comprising a plurality of cache lines, each cache line having one of a plurality of coherency states, and each PU coupled to at least another one of the plurality of PUs, the method comprising:

receiving from a first PU, by a second PU, a request to store a first data block from a first cache of the first PU in a second cache of the second PU;

determining whether the first data block matches, in the second cache, a cache line in a coherency state of shared;

in the event the first data block matches, in the second cache, a cache line in a coherency state of shared, accepting, by the second PU, the request, without data transfer;

in the event the first data block does not match, in the second cache, a cache line in a coherency state of shared, determining, by the second PU, whether the second cache contains a cache line in a coherency state of invalid;

in the event the second cache contains a cache line in a coherency state of invalid, accepting the request, storing the first data block in the cache line in a coherency state of invalid, and updating the coherency state of the first data block;

in the event the second cache does not contain a cache line in a coherency state of invalid, determining, by the second PU, whether the second cache contains a cache line in a coherency state of shared;

in the event the second cache contains a cache line in a coherency state of shared, accepting the request, storing the first data block in the cache line in a coherency state of shared, and updating the coherency state of the first data block;

in the event the second cache does not contain a cache line in a coherency state of shared, determining, by the second PU, whether the second cache contains a cache line in a coherency state of moved;

in the event the second cache does not contain a cache line in a coherency state of moved, rejecting the request;

in the event the second cache contains a cache line in a coherency state of moved, determining, by the second PU, whether the cache line in a coherency state of moved is also in a coherency state of tagged;

in the event the cache line in a coherency state of moved is also in a coherency state of tagged, casting out to memory the data in the cache line in a coherency state of moved; and accepting the request, storing the first data block in the cache location vacated by the cache line in a coherency state of moved, and updating the coherency state of the first data block.

8. The method of claim 7, further comprising:
in the event the second cache contains a cache line in a coherency state of moved, accepting the request, storing the first data block in the cache line in a coherency state of moved, and updating the coherency state of the first data block.

9. A processor comprising a computer program product for managing a cache in a data processing system with a system memory and a plurality of processing units (PUs), each PU having a cache comprising a plurality of cache lines, each cache line having one of a plurality of coherency states, and each PU coupled to at least another one of the plurality of PUs, the computer program product having a tangible non-transitory computer-readable medium with a computer program embodied thereon, the computer program comprising:

computer code for determining, by a first PU, that one of a plurality of cache lines in a first cache of the first PU must be replaced with a first data block;

computer code for determining, by the first PU, whether the first data block is a victim cache line from another one of the plurality of PUs;

computer code for, in the event the first data block is not a victim cache line from another one of the plurality of PUs, determining, by the first PU, whether the first cache contains a cache line in a coherency state of invalid;

computer code for, in the event the first cache contains a cache line in a coherency state of invalid, storing the first data block in the cache line in a coherency state of invalid and updating the coherency state of the first data block;

computer code for, in the event the first cache does not contain a cache line in a coherency state of invalid, determining, by the first PU, whether the first cache contains a cache line in a coherency state of moved;

computer code for, in the event the first cache contains a cache line in a coherency state of moved, selecting a cache line in a coherency state of moved, storing the first data block in the selected cache line in a coherency state of moved and updating the coherency state of the first data block;

computer code for, in the event the first cache contains a cache line in a coherency state of moved, determining, by the first PU, whether the first cache contains more than one cache line in a coherency state of moved;

computer code for, in the event the first cache contains more than one cache line in a coherency state of moved, selecting as a victim cache line a cache line in a coherency state of moved and tagged before any other coherency state, and selecting as a victim cache line a cache line in a coherency state of moved and exclusive before a cache line in a coherency state of moved and modified; and computer code for, storing the first data block in the victim cache line and updating the coherency state of the first data block.

10. The processor of claim 9, further comprising compute code for casting out to memory the selected cache line in a coherency state of moved.

11. The processor of claim 9, further comprising:
computer code for, in the event the first cache does not contain a cache line in a coherency state of moved, determining, by the first PU, the least-recently-used (LRU) cache line in the first cache;
computer code for determining, by the first PU, whether the LRU cache line is in a coherency state of shared; and
computer code for, in the event the LRU cache line is in a coherency state of shared, storing the first data block in the LRU cache line and updating the coherency state of the first data block.

12. The processor of claim 11, further comprising:
computer code for, in the event the LRU cache line is not in a coherency state of shared, determining whether the LRU cache line is in a coherency state of owned; and
computer code for, in the event the LRU cache line is in a coherency state of owned, requesting another one of the plurality of PUs to accept the LRU cache line.

13. The processor of claim 12, further comprising:
computer code for, in the event another one of the plurality of PUs accepts the LRU cache line, sending the LRU cache line to the accepting PU; and
computer code for storing the first data block in the first cache location vacated by the LRU cache line and updating the coherency state of the first data block.

14. The processor of claim 12, further comprising:
computer code for, in the event another one of the plurality of PUs rejects the LRU cache line, determining, by the first PU, whether the LRU cache line is in a coherency state of exclusive;
computer code for, in the event the LRU cache line is not in a coherency state of exclusive, casting out LRU cache line to memory; and
computer code for storing the first data block in the first cache location vacated by the LRU cache line and updating the coherency state of the first data block.

15. A processor comprising a computer program product for managing a cache in a data processing system with a system memory and a plurality of processing units (PUs), each PU having a cache comprising a plurality of cache lines, each cache line having one of a plurality of coherency states, and each PU coupled to at least another one of the plurality of PUs, the computer program product having a tangible non-transitory computer-readable medium with a computer program embodied thereon, the computer program comprising:

computer code for receiving from a first PU, by a second PU, a request to store a first data block from a first cache of the first PU in a second cache of the second PU;

computer code for determining whether the first data block matches, in the second cache, a cache line in a coherency state of shared;

computer code for, in the event the first data block matches, in the second cache, a cache line in a coherency state of shared, accepting, by the second PU, the request, without data transfer;

computer code for, in the event the first data block does not match, in the second cache, a cache line in a coherency state of shared, determining, by the second PU, whether the second cache contains a cache line in a coherency state of invalid;

computer code for, in the event the second cache contains a cache line in a coherency state of invalid, accepting the request, storing the first data block in the cache line in a coherency state of invalid, and updating the coherency state of the first data block;

computer code for, in the event the second cache does not contain a cache line in a coherency state of invalid, determining, by the second PU, whether the second cache contains a cache line in a coherency state of shared;

computer code for, in the event the second cache contains a cache line in a coherency state of shared, accepting the request, storing the first data block in the cache line in a coherency state of shared, and updating the coherency state of the first data block;

computer code for, in the event the second cache does not contain a cache line in a coherency state of shared, determining, by the second PU, whether the second cache contains a cache line in a coherency state of moved;

computer code for, in the event the second cache does not contain a cache line in a coherency state of moved, rejecting the request;

computer code for, in the event the second cache contains a cache line in a coherency state of moved, determining, by the second PU, whether the cache line in a coherency state of moved is also in a coherency state of tagged;

computer code for, in the event the cache line in a coherency state of moved is also in a coherency state of tagged, casting out to memory the data in the cache line in a coherency state of moved; and computer code for accepting the request, storing the first data block in the cache location vacated by the cache line in a coherency state of moved, and updating the coherency state of the first data block.

16. The processor of claim 15, further comprising:

computer code for, in the event the second cache contains a cache line in a coherency state of moved, accepting the request, storing the first data block in the cache line in a coherency state of moved, and updating the coherency state of the first data block.

* * * * *